Patented Dec. 4, 1951

2,577,709

UNITED STATES PATENT OFFICE 2,577,709

COATING COMPOSITION COMPRISING THE REACTION PRODUCT OF VINYL ESTERS OF TALL OIL ACIDS WITH STYRENE AND AN ISOPROPENYL COMPOUND, AND THE METHOD OF PREPARATION

Paul E. Marling, Dayton, Ohio, assignor to Monsanto Chemical Company, St. Louis, Mo., a corporation of Delaware No Drawing. Application September 29, 1948, Serial No. 51,858

10 Claims. (Cl. 260—27)

This invention relates to coating compositions utilizing inexpensive and readily available raw materials to form surfaces of excellent quality. More specifically the invention relates to coating compositions from styrene and vinyl tall oil acid esters.

The paint and varnish industry has been seeking more available sources for polymerizable substances useful as substitutes for drying oils, such as linseed oil. Due to the abundant availability of styrene at unusually low cost, attempts have been made to convert styrene into useful drying oil substitutes. Although some suitable compositions have been synthesized they are in general not entirely satisfactory and the products prepared therefrom are not competitive with natural drying oils. The styrenated oils and styrenated alkyd resins commercially available utilize a substantial portion of the natural drying oils, and are frequently cloudy or opaque by reason of incompatibility of many conventional varnish components, and the films prepared therefrom are brittle and readily deteriorate when subjected to water and alkali.

Drying oil substitutes prepared by the vinylation of tall oil acids are well known and modifications of these esters by interreaction with other monomers, such as styrene have been suggested. Such compositions, however, are not of general utility due to the incompatibility of the styrene and the tall oil acid vinyl esters when polymerized.

The primary purpose of this invention is to provide a new surface composition capable of forming coatings which are transparent, colorless and resistant to water. A further purpose of this invention is to utilize styrene and tall oil acid vinyl esters in the preparation of superior coating compositions. Other purposes will be apparent from the following specification.

The vinyl tall oil acid esters are compounds well known to the art and are prepared by the vinylation of tall oil acids by means of acetylene in the presence of certain heavy metal salt catalysts, such as mercury, zinc and cadmium salts. These esters are known to be capable of polymerization in the presence of organic peroxides in the manner similar to other vinyl esters. The tall oil acid vinyl esters are mixtures of the vinyl esters of aliphatic monocarboxylic acids having from 8 to 18 carbon atoms.

In accordance with this invention it has been discovered that when the vinyl esters of tall oil acids are treated in the presence of a mixture of styrene and an aromatic isopropenyl derivative a colorless, transparent liquid polymer is formed quite different from the polymers obtained when the vinyl esters are reacted with styrene alone. In the practice of this invention a mixture of from 5 to 50 percent of either α-methylstyrene or isopropenylbiphenyl and from 50 to 95 percent of styrene is first prepared and then added to from 33⅓ percent to 300 percent of a mixture of various vinyl esters derived from tall oil acids. Thus it is seen that the invention embraces an interreaction product ranging from 25 to 75 percent of the styrene type monomers and 75 to 25 percent of vinyl esters of tall oil acids, and preferably the aforementioned range may be 40 to 60 percent of the styrene type monomers and 60 to 40 percent of the vinyl esters of tall oil acids, the percent being on a weight basis of the interreaction product. The combination of reagents is effected at the reflux temperature of the reaction mixture and the reaction is continued to a temperature ranging from about 500 to 550° F. until a viscous liquid composition is obtained. The coating composition is prepared from the viscous liquid polymer by thinning to a suitable extent with a solvent therefor, such as turpentine, mineral spirits, xylene and other solvents.

Coating compositions so prepared may be either dried in air, in the presence of an infra red lamp if desired, or they may be baked in a suitable oven at elevated temperatures, for example 100° F. to 400° F.

Although the invention may be practiced by using any aromatic isopropenyl derivative with styrene and the vinyl esters of tall oil acids, the use of isopropenylbiphenyl is especially valuable, since, in addition to producing entirely compatible compounds the coated surfaces are flexible, whereas those prepared from α-methylstyrene in combination with styrene and the vinyl esters of tall oil acids are somewhat brittle.

Further details of the preparation and use of the new coating compositions are set forth with respect to the following example.

*Example*

Coating compositions were prepared by charging 50 parts by weight of the vinyl esters of tall oil acids to each of three suitable flasks provided with water-cooled reflux condensers. To the first flask there was added 35 parts by weight of styrene, 15 parts of α-methylstyrene and 2 parts of benzoyl peroxide, dropwise, over a period of five hours. Similarly, 35 parts by weight of styrene, 15 parts of isopropenylbiphenyl and two parts of benzoyl peroxide were gradually added to the second flask. The third flask was used as a control and in the identical manner 50 parts by weight of styrene and two parts of benzoyl peroxide were used. After the reagents of each of the three flasks were entirely combined the temperature was raised to 520° F., which was maintained for two hours. The viscous liquids so obtained were thinned with 50 parts by weight of mineral spirits. Smooth surfaces of wood and metal were coated with the compositions and it was found that although the control samples were cloudy by reason of incompatibility, the interreaction products including α-methylstyrene and isopropenylbiphenyl were clear and entirely transparent. The samples prepared from the vinyl esters of tall oil acid interaction products with styrene and isopropenylbiphenyl were superior in color, much more flexible and much more resistant to the effects of water than either the control samples or the samples utilizing the interreaction products of α-methylstyrene.

The invention is defined by the following claims.

I claim:

1. The coating composition prepared in accordance with the method of claim 3.

2. The coating composition prepared in accordance with the method of claim 5.

3. A method of preparing a coating composition which comprises heating vinyl esters of tall oil acids while gradually adding thereto from 33⅓ percent to 300 percent of a mixture of 50 to 95 percent styrene and 5 to 50 percent of a compound of the group consisting of isopropylbiphenyls and isopropylbenzene, at the reflux temperature of the reaction mixture, and in the presence of the catalyst, benzoyl peroxide; and continuing heating the mixture to a temperature of 500 to 550° F., and thinning the product with a miscible solvent.

4. A method of preparing a coating composition which comprises heating vinyl esters of tall oil acids while gradually adding thereto from 66⅔ percent to 150 percent of a mixture of 50 to 95 percent styrene and 5 to 50 percent of a compound of the group consisting of isopropenylbiphenyls and isopropenylbenzene, at the reflux temperature of the reaction mixture, and in the presence of the catalyst, benzoyl peroxide; and heating the mixture to a temperature of 500 to 550° F., and thinning the product with a miscible solvent.

5. A method of preparing a coating composition which comprises heating vinyl esters of tall oil acids while gradually adding thereto from 33⅓ percent to 300 percent of a mixture of 50 to 95 percent styrene and 5 to 50 percent of an isopropenylbiphenyl, at the reflux temperature of the reaction mixture, and in the presence of the catalyst, benzoyl peroxide; and heating the mixture to a temperature of 500 to 550° F., and thinning the product with a miscible solvent.

6. A method of preparing a coating composition which comprises heating vinyl esters of tall oil acids while gradually adding thereto from 66⅔ percent to 150 percent of a mixture of 50 to 95 percent styrene and 5 to 50 percent of an isopropenylbiphenyl, at the reflux temperature of the reaction mixture, and in the presence of the catalyst, benzoyl peroxide; and heating the mixture to a temperature of 500 to 550° F., and thinning the product with a miscible solvent.

7. A method of preparing a coating composition which comprises heating vinyl esters of tall oil acids while gradually adding thereto from 33⅓ percent to 300 percent of a mixture of 50 to 95 percent styrene and 5 to 50 percent of a compound of the group consisting of isopropenylbiphenyls and isopropenylbenzene, at the reflux temperature of the reaction mixture, and in the presence of an organic peroxide polymerization catalyst; and continuing heating the mixture to a temperature of 500 to 550° F., and thinning the product with a miscible solvent.

8. A method of preparing a coating composition which comprises heating vinyl esters of tall oil acids while gradually adding thereto from 66⅔ percent to 150 percent of a mixture of 50 to 95 percent styrene and 5 to 50 percent of a compound of the group consisting of isopropenylbiphenyls and isopropenylbenzene, at the reflux temperature of the reaction mixture, and in the presence of an organic peroxide polymerization catalyst; and heating the mixture to a temperature of 500 to 550° F., and thinning the product with a miscible solvent.

9. A method of preparing a coating composition which comprises heating vinyl esters of tall oil acids while gradually adding thereto from 33⅓ percent to 300 percent of a mixture of 50 to 95 percent styrene and 5 to 50 percent of an isopropenylbiphenyl, at the reflux temperature of the reaction mixture, and in the presence of an organic peroxide polymerization catalyst; and heating the mixture to a temperature of 500 to 550° F., and thinning the product with a miscible solvent.

10. A method of preparing a coating composition which comprises heating vinyl esters of tall oil acids while gradually adding thereto from 66⅔ percent to 150 percent of a mixture of 50 to 95 percent styrene and 5 to 50 percent of an isopropenylbiphenyl, at the reflux temperature of the reaction mixture, and in the presence of an organic peroxide polymerization catalyst; and heating the mixture to a temperature of 500 to 550° F., and thining the product with a miscible solvent.

PAUL E. MARLING.

REFERENCES CITED

The following references are of record in the file of this patent:

UNITED STATES PATENTS

| Number | Name | Date |
|---|---|---|
| 2,118,864 | Reppe et al. | May 31, 1938 |
| 2,228,365 | Reppe et al. | Jan. 14, 1941 |
| 2,457,768 | Arvin et al. | Dec. 28, 1948 |
| 2,468,748 | Griess et al. | May 3, 1949 |